United States Patent [19]

DeGroot

[11] Patent Number: 5,153,669
[45] Date of Patent: Oct. 6, 1992

[54] THREE WAVELENGTH OPTICAL MEASUREMENT APPARATUS AND METHOD

[75] Inventor: P. J. DeGroot, Seattle, Wash.

[73] Assignee: Hughes Danbury Optical Systems, Inc., Danbury, Conn.

[21] Appl. No.: 676,144

[22] Filed: Mar. 27, 1991

[51] Int. Cl.⁵ .............................................. G01B 9/02
[52] U.S. Cl. ................................. 356/349; 356/357; 356/355; 356/360
[58] Field of Search ............... 356/349, 360, 355, 356, 356/357, 358

[56] References Cited

U.S. PATENT DOCUMENTS 4,886,362  12/1989  Oono ................................. 356/349

Primary Examiner—Samuel A. Turner
Assistant Examiner—Richard E. Kurtz, II
Attorney, Agent, or Firm—W. K. Denson-Low; W. J. Streeter; R. A. Hays

[57] ABSTRACT

Optical metrology method and apparatus wherein three optical wavelengths are generated and separated into a reference beam (RB) and an object beam (OB) having substantially equal optical path lengths. After reflecting from a surface being measured OB is combined with RB and provided to sensors which measure the intensity associated with each of the wavelengths. Any difference between the intensities is indicative of a difference in the optical path lengths of OB and RB and is a function of the polarization state of each of the three returned wavelengths. Differences in optical path length are shown to be indicative of a displacement of the object being measured. Preferably, two multimode laser diodes (12,14) are provided for generating the three optical wavelengths. Two synthetic wavelengths are derived from the three optical wavelengths and are employed to improve the precision of measurement while retaining a large dynamic range made possible by the use of a large synthetic wavelength.

18 Claims, 2 Drawing Sheets

THREE WAVELENGTH OPTICAL MEASUREMENT APPARATUS AND METHOD

CROSS REFERENCE TO A RELATED PATENT APPLICATION

This U.S. patent application is related to a copending and commonly assigned U.S. patent application Ser. No. 07/676,049, filed Mar. 27, 1991, entitled "Optical Thickness Profiler", by H. Eugene Waldenmaier, Peter J deGroot, and Guy H. Hayes.

FIELD OF THE INVENTION

This invention relates generally to optical metrology and, in particular, to optical metrology apparatus and method that employs two synthetic wavelengths and an optical wavelength to obtain sub-nanometer measurement resolution.

BACKGROUND OF THE INVENTION

One known method to extend the range of optical metrology applications for interferometry is to measure the interferometric phase at two distinct wavelengths.

When monochromatic light is made to interfere with itself in a two-beam interferometer, the output intensity as measured by a square-law detector is proportional to a function h:

$$h(mx) = \cos^2(\pi m), \quad (1)$$

where m is a real number, referred to herein as the fringe order, equal to one over $2\pi$ times the relative phase of one beam to the other. The optical path difference between the two beams is related to the fringe order by $$L = m\lambda/2, \quad (2)$$

where L is the one-way optical path difference, including the refractive index, and $\lambda$ is the vacuum wavelength. In that h is a periodic function, the integer part of m cannot be determined by inverting Eq. (1). Interferometry typically provides only the fractional part f(m) of the fringe order, with the consequence that only changes of the length L, and not its absolute value, can be measured directly. This integer fringe-order ambiguity limits the usefulness of interferometry in many applications.

The purpose of multiple-color, or multiple-wavelength, interferometry is to measure the integer part of m so that the entire length L may be directly measured with great precision in terms of the vacuum wavelength.

Analytical procedures for determining lengths from multiple-wavelength interferometry exist in a variety of forms. One such procedure employs the concept of synthetic wavelengths, corresponding to differences in phase measurements for pairs of wavelengths in the interferometer.

By example, and considering three optical wavelengths $\lambda_1$, $\lambda_2$, and $\lambda_3$, there are three possible synthetic wavelengths defined by $$1/\Lambda_{ij} = 1/\lambda_i - 1/\lambda_j, \lambda_j > \lambda_i. \quad (3)$$

It is noted that a synthetic wavelength can be made much larger than a visible wavelength by choosing appropriate pairs of wavelengths $\lambda_i$, $\lambda_j$. The corresponding synthetic fringe orders $M_{ij}$ are obtained from the differences in optical fringe orders $m_i$ and $m_j$ as:

$$M_{ij} = m_i - m_j \quad (4)$$

The length L may be calculated from a synthetic wavelength measurement as:

$$L = (M_{ij}\Lambda_{ij})/2. \quad (5)$$

The larger the synthetic wavelength the greater the range of distances L that can be accommodated without possibility of error due to an integer ambiguity in the value of $M_{ij}$. Conversely, the precision in the measurement of L is optimized when using relatively small synthetic wavelengths.

The following prior art discuss various aspects of conventional two-wavelength interferometry. As described in U.S. Pat. No. 4,832,489, issued May 23, 1989, to J. C. Wyant et al., a two-wavelength phase-shifting interferometer employs two laser sources for reconstructing steep surface profiles, such as aspheric surfaces. A $256 \times 256$ detector array is used and the technique computes an equivalent phase independently for each detector.

The following articles discuss various aspects of employing a synthetic wavelength for surface profilometry.

In an article entitled "Contouring Aspheric Surfaces Using Two-Wavelength Phase-Shifting Interferometry" by K. Creath, Y. Cheng, and J. Wyant, Optica Acta, 1985, Vol. 32, No. 12, 1455–1464 there is described two-wavelength holography using an argon-ion laser and a He-Ne laser. Two wavelengths from the argon-ion laser (0.4880 micrometers or 0.5145 micrometers) were employed in conjunction with a single wavelength (0.6328 micrometers) from the He-Ne laser to yield equivalent wavelengths of 2.13 micrometers and 2.75 micrometer. An uncoated test surface was placed in one arm of the interferometer and interferograms were recorded using a $100 \times 100$ diode array.

In an article entitled "Absolute Optical Ranging with 200-nm Resolution" by C. Williams and H. Wickramasinghe, Optics Letters, Vol. 14, No. 11, Jun. 1, 1989 there is described optical ranging by wavelength-multiplexed interferometry and surface profiling said to be carried out on an integrated circuit structure. A pair of GaAlAs single-mode diode lasers are used as optical sources.

In an article entitled "Two-wavelength scanning spot interferometer using single-frequency diode lasers" by A. J. de Boef, Appl. Opt., Vol. 27, No. 2, Jan. 15, 1988 (306–311) there is described the use of two single frequency laser diodes to measure the profile of a rough surface. The two wavelengths are not time-multiplexed but are instead continuously present.

In an article entitled "Two-Wavelength Speckle Interferometry on Rough Surfaces Using a Mode Hopping Diode Laser" by A. Fercher, U. Vry and W. Werner, Optics and Lasers in Engineering 11, (1989) pages 271–279 there is described a time-multiplexed two-wavelength source consisting of a single mode diode that is switched between two adjacent oscillation modes. The switching is accomplished by pump-current modulation with the diode thermally tuned to a region near a so-called "mode hop", that is, near a region where the diode output readily switches from one wavelength output to another. This technique is said to have enabled the profiling of a ground lens surface.

As was previously stated, the larger the synthetic wavelength, the greater the range of distances (L) that can be accommodated without possibility of error due to an integer ambiguity in the value of the synthetic wavelength fringe order ($M_{ij}$). However, the precision in the measurement of L is best when small synthetic wavelengths are used.

It is thus an object of the invention to provide optical metrology apparatus that employs a plurality of synthetic wavelengths of different size.

It is a further object of the invention to provide optical metrology apparatus that employs a plurality of synthetic wavelengths of different size, the synthetic wavelengths being derived from three optical wavelengths emitted from two laser diodes, at least one of which is a multi-mode laser diode.

It is another object of the invention to provide optical metrology apparatus that employs a plurality of synthetic wavelengths of different size, using progressively smaller synthetic wavelengths to improve the precision of measurement while retaining the dynamic range made possible by a large synthetic wavelength.

SUMMARY OF THE INVENTION

The foregoing and other problems are overcome and the objects of the invention are realized by method and apparatus for performing optical metrology. In accordance with a method of the invention, and apparatus for accomplishing same, a first step generates an optical output having a plurality of optical wavelengths. A next step modifies the optical output to provide a phase modulated reference beam and a measurement beam that are orthogonally polarized with respect to one another. The measurement beam is directed to and reflects from at least one surface. A further step combines the phase modulated reference beam and the reflected measurement beam into a combined beam. A next step detects, in accordance with a polarization state of three optical wavelengths within the combined beam, a difference between an optical path length of the reference beam and an optical path length of the measurement beam. The difference in path lengths is indicative of an absolute distance L.

The teaching of the invention provides an optical metrology system wherein three optical wavelengths of a fixed polarization are separated into two beams (OB and RB) having, ideally, nearly equal optical path lengths. The two beams are recombined and provided to sensors which measure the intensity associated with each of the wavelengths.

The teaching of the invention furthermore provides a plurality of multimode laser diodes for generating three optical wavelengths. Two synthetic wavelengths are derived from the three optical wavelengths. The synthetic wavelengths are of different size and progressively smaller synthetic wavelengths are employed to improve the precision of measurement while retaining a large dynamic range made possible by the use of a large synthetic wavelength.

BRIEF DESCRIPTION OF THE DRAWING

The above set forth and other features of the invention are made more apparent in the ensuing detailed description of the invention when read in conjunction with the attached drawing, wherein.

DETAILED DESCRIPTION OF THE INVENTION

Figure 1:
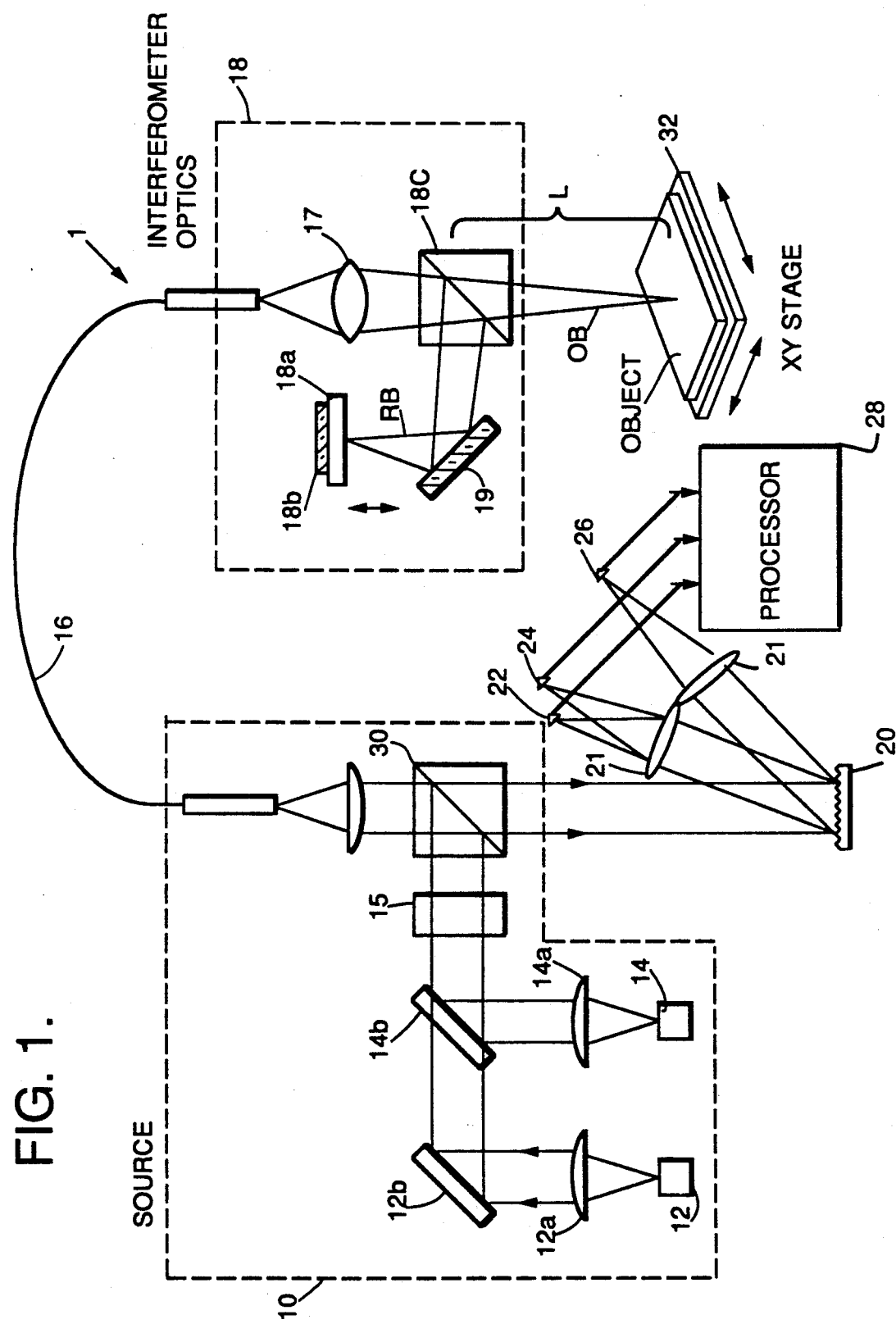
FIG. 1 is a simplified block diagram of a three-color interferometer for performing absolute distance measurement and surface profiling.

Referring first to FIG. 1 there is shown a three-wavelength, or three-color, optical metrology system 1 that is constructed and operated in accordance with an embodiment of the invention. System 1 includes a three-wavelength source 10 that includes, preferably, two multimode laser diodes 12 and 14, collimating optics 12a and 14a, mirrors 12b and 14b, and an optical isolator 15. The laser diodes 12 and 14 are simultaneously operated and thus simultaneously provide three wavelengths. The emission from each laser diode 12 and 14 is transmitted through an optical fiber 16 to phase-modulating, two-beam polarizing interferometer optics 18. A reflected object beam, also referred to as a measurement beam, and a reference beam are recombined and transmitted back through the optical fiber 16 to a diffraction grating 20. Detectors 22, 24 and 26 are positioned in space to intercept the separated wavelengths provided by the grating 20, via focussing optics 21, and to measure the intensity of the three different wavelengths. A processor 28 calculates fringe orders and determines an absolute distance (L) to the object surface.

Figure 1A:
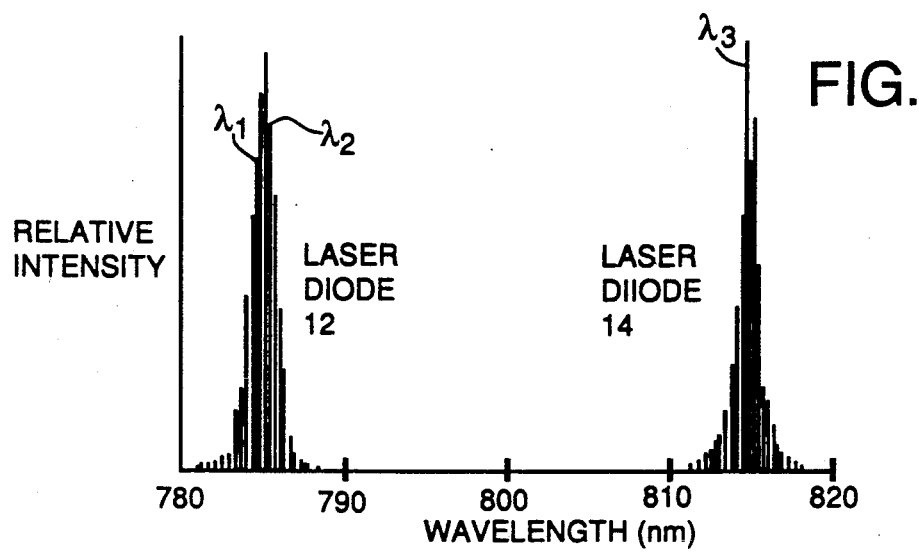
FIG. 1a is a graph showing the combined optical spectrum of two multi-mode laser diodes.

As can be seen in the graph of FIG. 1a in the three-wavelength interferometer system 1 two different wavelengths ($\lambda_1, \lambda_2$) in the 785 nm region of the spectrum are selected to derive a first synthetic wavelength $\Lambda_{12} = 720$ micrometers, and $\lambda_1$ is combined with a third wavelength $\lambda_3$ from the 815 nm region for generating a significantly smaller synthetic wavelength $\Lambda_{13} = 20$ 20 micrometers. The laser wavelength separation required for a $\Lambda_{13} = 20$ micrometer synthetic wavelength is 32 nm, which is relatively large when compared to the 0.3 nm mode separation of a typical laser diode output. Thus, two diodes are required, with different center wavelengths. In principle, since only three wavelengths are used, one laser diode may be a multimode device and the other a single-mode device. However, the use of two multimode laser diodes is preferred in that undesirable mode hopping associated with single-mode laser diodes is avoided. Two suitable multimode laser diodes are Sharp LT010MDO and LT023MDO laser diode devices.

The optical fiber 16 spatially filters the emissions of the laser diodes 12 and 14 and facilitates the mechanical mounting of the interferometer optics 18 for different measurement tasks. The source light from the optical fiber 16 is focussed at the object surface by optical element 17 and is split into an object beam (OB), and into a reference beam (RB). Reference beam RB is directed, via a reflector 19, to a mirror 18a that is coupled to a piezo-electrical transducer 18b. The mirror 18a is oscillated by the transducer 18b and functions to phase modulate the reference beam RB. Suitable oscillation frequencies in the range of approximately zero to approximately 1000 Hz may be employed, although the teaching of the invention is not limited to this range. For example, an electro-optic device such as a Kerr cell may be employed to achieve significantly greater rates of oscillation. OB and RB are given fixed orthogonal polarizations by a polarizing beam splitter 18c. As a result, when the two beams are recombined into the optical fiber 16 after reflection, the resultant polarization vector rotates with the phase modulation. The light from the interferometer optics 18 is transmitted back through the fiber optic 16 to a polarizing beam splitter 30 at the source end of the optical fiber 16. The reflected light is analyzed after passing through the beam splitter 30. The light is separated into its constituent wavelengths by the diffraction grating 20 such that the individual wavelengths of the combined optical spectra appear as a series of spatially distinct points in space. The detectors 22, 24, and 26 are positioned at these spatially distinct points for detecting the intensity associated with each of the three wavelengths. The operation of the phase modulator of the interferometer optics 18 results in a wavelength-dependent and a phase-dependent amplitude modulation of the radiation.

As can be seen, the teaching of the invention provides an optical metrology system wherein three wavelengths of a fixed polarization are separated into two beams (OB and RB) having substantially equal optical path lengths. The two beams are recombined and provided to sensors which measure the intensity associated with each of the wavelengths. Furthermore, the source/detector optics and the interferometer optics may be mechanically decoupled from one another by the use of the optical fiber 16.

The processor 28 may actively control the phase modulation of the interferometer optics 18 while recording the intensity measured by the three detectors 22, 24 and 26. Alternately, the phase modulator may run at a fixed rate and the processor 28 may employ well known statistical methods applied over a group of samples. In either case, a suitable phase demodulation algorithm is used to determine the optical fringe orders (m) corresponding to the three wavelengths $\lambda_i$. One suitable phase demodulating algorithm is known as a five point algorithm and is described by P. Harihan, B. F. Oreb and T. Eiju in Appl. Opt. 26 2504 (1987). Length calculations involving Eq.(6), Eq.(7) and Eq.(8), described below, are performed in software and the results may be displayed to an operator and/or stored on disk. The change in optical path length is measured by applying Eq. (2), (6), (7), and (8) after detection of the relative interferometric phase at each of the three wavelengths.

Although not shown in FIG. 1, the system 1 further includes laser diode power supplies, thermoelectric coolers, detector amplifiers, a piezoelectric driver, and an analog input interface that couples the detector outputs to the processor 28.

In accordance with an aspect of the invention there are considered three wavelengths $\lambda_1 < \lambda_2 < \lambda_3$, and two corresponding synthetic wavelengths $\Lambda_{12} > \Lambda_{13}$. The procedure for measuring an absolute distance L with interferometric resolution is as follows.

Assuming that L is less than $\Lambda_{12}/4$, the integer part of the synthetic fringe order $M_{12}$ is zero, and $$M_{12} = f(M_{12}) = f(m_1) - f(m_2). \tag{6}$$

The fractional parts $f(m_i)$ of the interferometric fringe orders $m_i$ are obtained by inverting Eq. (1) or by performing some equivalent phase-detection algorithm. A next step uses the shorter synthetic wavelength $\Lambda_{13}$ to increase the precision in the measurement. The following equation makes use of $M_{12}$ in calculating $M_{13}$ without an integer ambiguity:

$$M_{13} = f(M_{13}) + I((M_{12}\Lambda_{12}/\Lambda_{13}) - f(M_{13})). \tag{7}$$

The function I(a) appearing in Eq.(7) yields the integer nearest to the argument a. The optical fringe order $m_1$ is now calculated from $$m_1 = f(m_1) + I((M_{13}\Lambda_{13}/\lambda_1) - f(m_1)). \tag{8}$$

The final step employs Eq.(5) to determine the distance L. The measurement of L is thus accomplished as a three-step process, wherein $M_{12}$ is used to remove the integer fringe order ambiguity in the calculation of $M_{13}$, and $M_{13}$ is used in the calculation of $m_1$. This technique results in interferometric accuracy, but without the integer fringe-order ambiguity of conventional single-wavelength interferometry.

For the illustrated embodiment the largest synthetic wavelength is 720 micrometers and the distance L is measured absolutely over a ±180 micrometer range about zero. When L is equal to zero there is no optical path length difference between the reference and object beams in the interferometer optics 18. For values of L outside this ±180 micrometer range the measurement is relative, with an ambiguity interval of 360 micrometers. However, for many metrology applications there is sufficient knowledge of the object under measurement to remove this ambiguity.

The synthetic wavelengths must be chosen so as to substantially eliminate a possibility of introducing integer errors in Eq. (7) and Eq. (8). This restraint places upper limits on the size of the synthetic wavelengths used in the three-wavelength interferometer system 1. It can be shown that the following conditions must be satisfied:

$$\Lambda_{12} < 1/\Delta m(\Lambda_{13}/4 - L/2(\Delta\Lambda_{12}/\Lambda_{12} + \Delta\Lambda_{13}/\Lambda_{13})) \tag{9}$$

and $$\Lambda_{13} < 1/\Delta m(\lambda/4 - L/2(\Delta\lambda_{13}/\Lambda_{13} + \Delta\lambda/\lambda)) + \lambda. \tag{10}$$

where the uncertainties $\Delta m$, $\Delta\lambda$, $\Delta\Lambda_{12}$, and $\Delta\Lambda_{13}$ refer to the maximum absolute values of the possible errors in any one of the parameters m, $\lambda$, $\Lambda_{12}$, and $\Lambda_{13}$, respectively.

Figure 2:
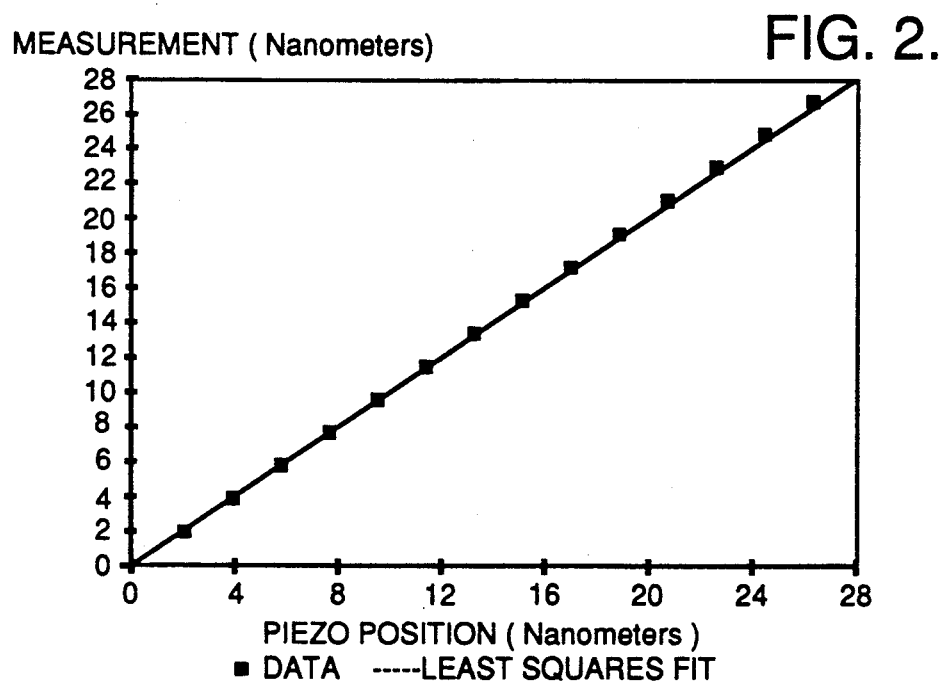
FIG. 2 is a graph depicting a high resolution displacement measurement performed by the three-wavelength interferometer of FIG. 1.

Referring to FIG. 2 there is shown a high-resolution displacement measurement performed by the three-wavelength interferometer system 1 of FIG. 1. The object was moved slowly towards the interferometer optics 18 by a piezoelectric translator mounted behind the object mirror. The measurement repeatability was 0.5 nm.

Figure 3:
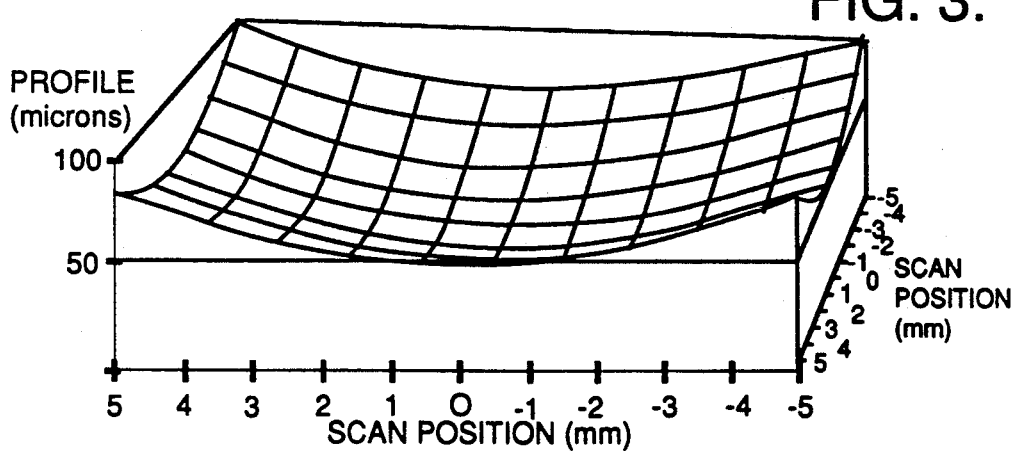
FIG. 3 is a graph of a central region of an unsilvered parabolic mirror obtained with the three-wavelength interferometer of FIG. 1.

Referring to FIG. 3 there is shown a profile of a central 1×1 cm region of a 7.5 cm diameter, f/2 unsilvered parabolic mirror. Each one of the 100 independent distance measurements made for this profile was absolute. The three-color interferometer system of the invention is particularly useful for profiling unusual topographical surfaces and optical components that cannot be tested by conventional full-aperture interferometry.

Since each of the 100 measurements was absolute, there was no requirement to interpret fringes or perform high-bandwidth phase tracking as the mirror was being translated from one point to the next. It should be noted that the slope of 20 micrometers of profile variation per millimeter of scan near the edge of the data grid is well beyond the capability of a conventional full-aperture figure-testing interferometer. This capability makes the three-wavelength interferometer system of the invention particularly useful for figure metrology of unusual optical components, such as off-axis aspheres and segmented optics. In general, the profilometry accuracy is determined by the flatness of travel of the XY stage, which must be characterized for high-precision measurements. Alternatively, a Fizeau-teype geometry may be used for the interferometer optics so that the measurement is less sensitive to random mechanical motion of the stage.

Although the present invention has been described in the context of specific wavelengths and optical components it should be realized that other wavelengths and more or less than the number of optical components shown in the figures may be employed, while yet obtaining the same result. Also, although the various lens elements are depicted as simple lens elements it should be realized that each may include a number of optical components to achieve the desired function. Thus, while the present invention has been particularly shown and described with respect to an embodiment thereof, it will be understood by those skilled in the art that changes in form and details may be made therein without departing from the scope and spirit of the invention.

What is claimed is:

1. Optical metrology apparatus comprising:
   optical source means including a plurality of laser means, at least one of which is a multi-mode laser diode means, the optical source means having an output beam that simultaneously includes at least three discrete optical wavelengths;
   means, coupled to an output of the optical source means, for separating the output beam into a reference beam and into a measurement beam, the measurement beam being directed to a surface of interest;
   means for combining into a combined beam the reference beam and a portion of the measurement beam that reflects from the surface of interest; and
   means, responsive to a relative interferometric phase at each of the three optical wavelengths within the combined beam, for detecting a difference between an optical path length of the reference beam and an optical path length of the measurement beam.

2. Apparatus as set forth in claim 1 and further including an optical fiber for conveying the output beam and the combined beam.

3. Apparatus as set forth in claim 2 wherein the optical fiber is a single mode optical fiber.

4. Apparatus as set forth in claim 1 wherein the detecting means includes diffraction grating means for separating the combined beam into a plurality of beams each of which corresponds to one of the three wavelengths.

5. Apparatus as set forth in claim 4 and further comprising a plurality of photodetectors individual ones of which are disposed for receiving one of the plurality of beams for measuring a beam intensity thereof.

6. Apparatus as set forth in claim 5 and further including means, coupled to an output of each of the plurality of detectors, for processing the output thereof to determine a displacement of the surface of interest.

7. Apparatus as set forth in claim 1 wherein the optical source means includes a first multi-mode laser diode means providing at least two wavelengths and a second laser diode means providing a third wavelength.

8. Apparatus as set forth in claim 7 wherein each of the laser diode means is a multi-mode laser diode.

9. Apparatus as set forth in claim 1 wherein the separating means includes a polarizing beam splitter means disposed for receiving the optical output of the source means and for orthogonally polarizing the reference beam with respect to the measurement beam.

10. Apparatus as set forth in claim 1 wherein the separating means includes means for focussing the measurement beam upon the surface of interest.

11. Apparatus as set forth in claim 1 wherein the detecting means includes means for deriving a first synthetic wavelength and a second synthetic wavelength from the three optical wavelengths.

12. Apparatus as set forth in claim 1 and further including means for phase modulating the reference beam with respect to the measurement beam.

13. A method for performing optical metrology, comprising the steps of:
   operating a plurality of laser means, at least one of which is a multimode laser diode means, for generating an optical output having a plurality of optical wavelengths;
   modifying the optical output to provide a phase modulated reference beam and a measurement beam having a fixed polarization relationship one to another, the measurement beam being directed to and reflecting from a surface of interest;
   combining the phase modulated reference beam and the reflected measurement beam into a combined beam; and
   responsive to a relative interferometric phase at each of the three optical wavelengths within the combined beam, detecting a difference between an optical path length of the reference beam and an optical path length of the measurement beam.

14. A method as set forth in claim 13 wherein the step of modifying includes a step of phase modulating the reference beam.

15. A method as set forth in claim 13 wherein the step of detecting includes a step of deriving a first synthetic wavelength and a second synthetic wavelength from the plurality of optical wavelengths.

16. A method as set forth in claim 13 wherein the step of operating includes a step of simultaneously operating at least two multi-mode laser diodes.

17. A method as set forth in claim 13 and including a step of translating the surface of interest with respect to the measurement beam.

18. A method of performing optical metrology to determine an absolute distance (L), comprising the steps of:
   operating at least one multi-mode laser diode means while generating a plurality of optical wavelengths ($\lambda$) such that $\lambda_1 < \lambda_2 < \lambda_3$, and deriving two corresponding synthetic wavelengths $\Lambda_{12} > \Lambda_{13}$ therefrom;
   for $L < \Lambda_{12}/4$, determining a first synthetic fringe order ($M_{12}$) in accordance with $$M_{12} = f(M_{12}) = f(m_1) - f(m_2),$$

where $m_1$ is the optical fringe order of $\lambda_1$ and $m_2$ is the optical fringe order of $\lambda_2$;

employing $M_{12}$ in determining $M_{13}$ in accordance with $$M_{13} = f(M_{13}) + I((M_{12}\Lambda_{12}/\Lambda_{13}) - f(M_{13})).$$

where the function $I(a)$ yields an integer nearest to a value of the argument $(a)$;

determining the optical fringe order $m_1$ in accordance with $$m_1 = f(m_1) + I((M_{13}\Lambda_{13}/\lambda_1) - f(m_1)); \text{ and}$$

determining the absolute distance L in accordance with $$L = (M_{ij}\Lambda_{ij})/2.$$

* * * * *